Nov. 28, 1950 R. J. REEK ET AL 2,531,702
SUPPORT FOR ELECTRICAL MACHINES
Filed Nov. 19, 1947 3 Sheets-Sheet 1

INVENTORS
ROYAL J. REEK
FRANKLIN O. WISMAN
BY
Cecil F Arens
ATTORNEY

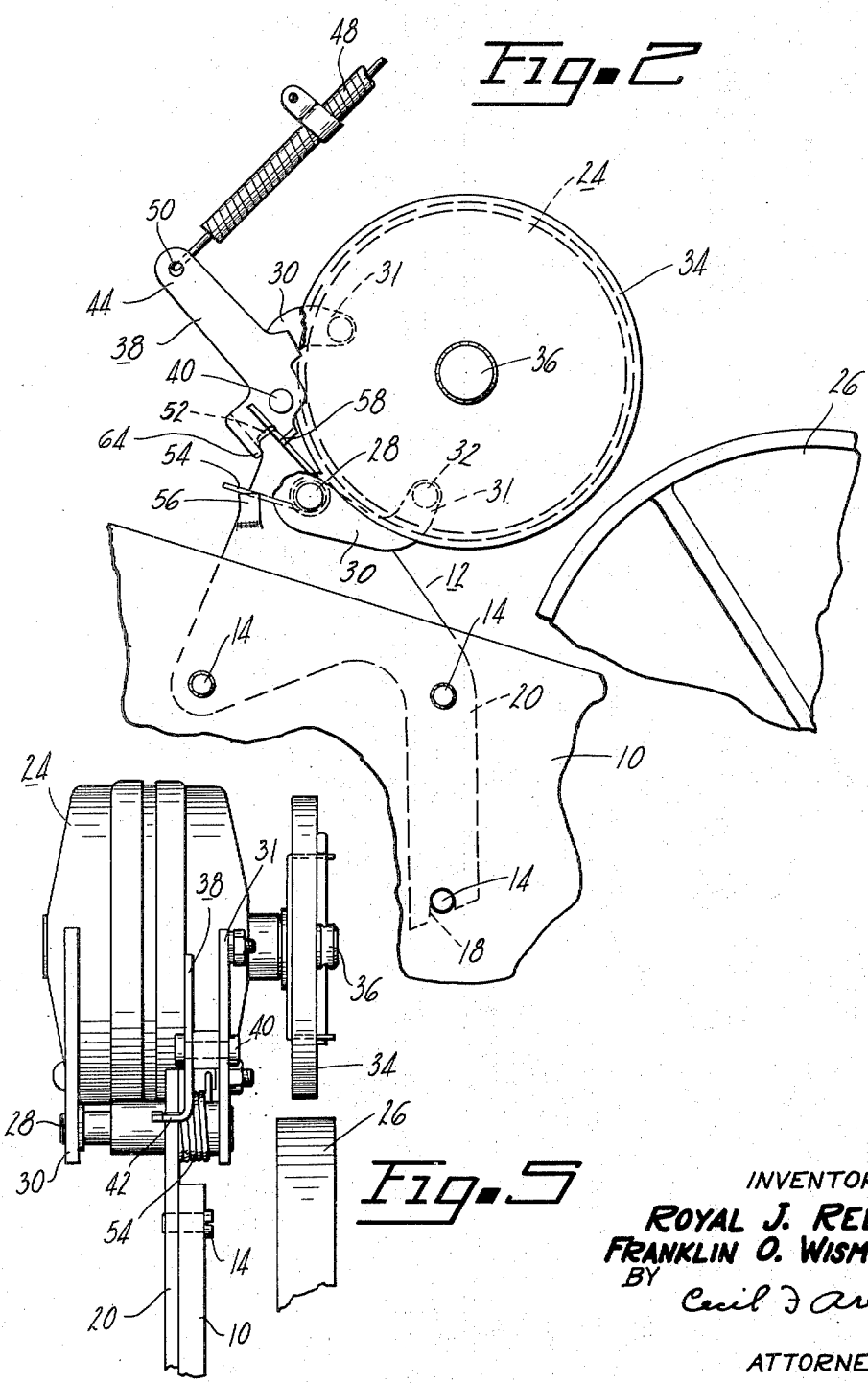

Nov. 28, 1950 R. J. REEK ET AL 2,531,702
SUPPORT FOR ELECTRICAL MACHINES
Filed Nov. 19, 1947 3 Sheets-Sheet 3

INVENTORS
ROYAL J. REEK
FRANKLIN O. WISMAN
BY Cecil J Arens
ATTORNEY

Patented Nov. 28, 1950

2,531,702

UNITED STATES PATENT OFFICE 2,531,702

SUPPORT FOR ELECTRICAL MACHINES

Royal J. Reek and Franklin O. Wisman, South Bend, Ind., assignors to Bendix Aviation Corporation, South Bend, Ind., a corporation of Delaware Application November 19, 1947, Serial No. 787,000

8 Claims. (Cl. 74—207)

This invention relates to a mechanism for supporting a device, and more particularly to an articulated type bracket used for supporting a device in at least two positions.

An important object of the invention resides in the provision of a hinged supporting bracket for mounting a generator in driving relationship to a driving member and provided with a latching lever which releasably supports the generator out of engagement with the driving member.

Another important object of the invention resides in the provision of a hinged supporting bracket for mounting a generator or motor in driving relationship to a rotatable member and releasably latchable out of driving relationship therewith, and provided with means for remotely releasing said generator or motor.

A still further object of the invention lies in the provision of an articulated bracket carried by a vehicle frame and mounting a generator in driving relationship to one of the vehicle wheels. The arrangement being such that when the generator is latched out of driving relationship with the wheel an actuating lever may be remotely operated to release said generator for driving engagement with said wheel.

Another object of the invention lies in the provision of an articulated bracket for mounting a generator or the like in driving relationship with a rotatable member and movable into and out of driving relationship with said member by remotely operated means.

The above and other objects and features of the invention will be apparent from the following description of the apparatus taken in connection with the accompanying drawings which form a part of this specification, and in which:

Figure 2 is a view in side elevation of the device in latched position, but looking at the same from a side of the vehicle opposite to that of Figure 1;

Figure 5 is a front elevational view of the device of Figure 1 with parts broken away for clarity.

Figure 1:
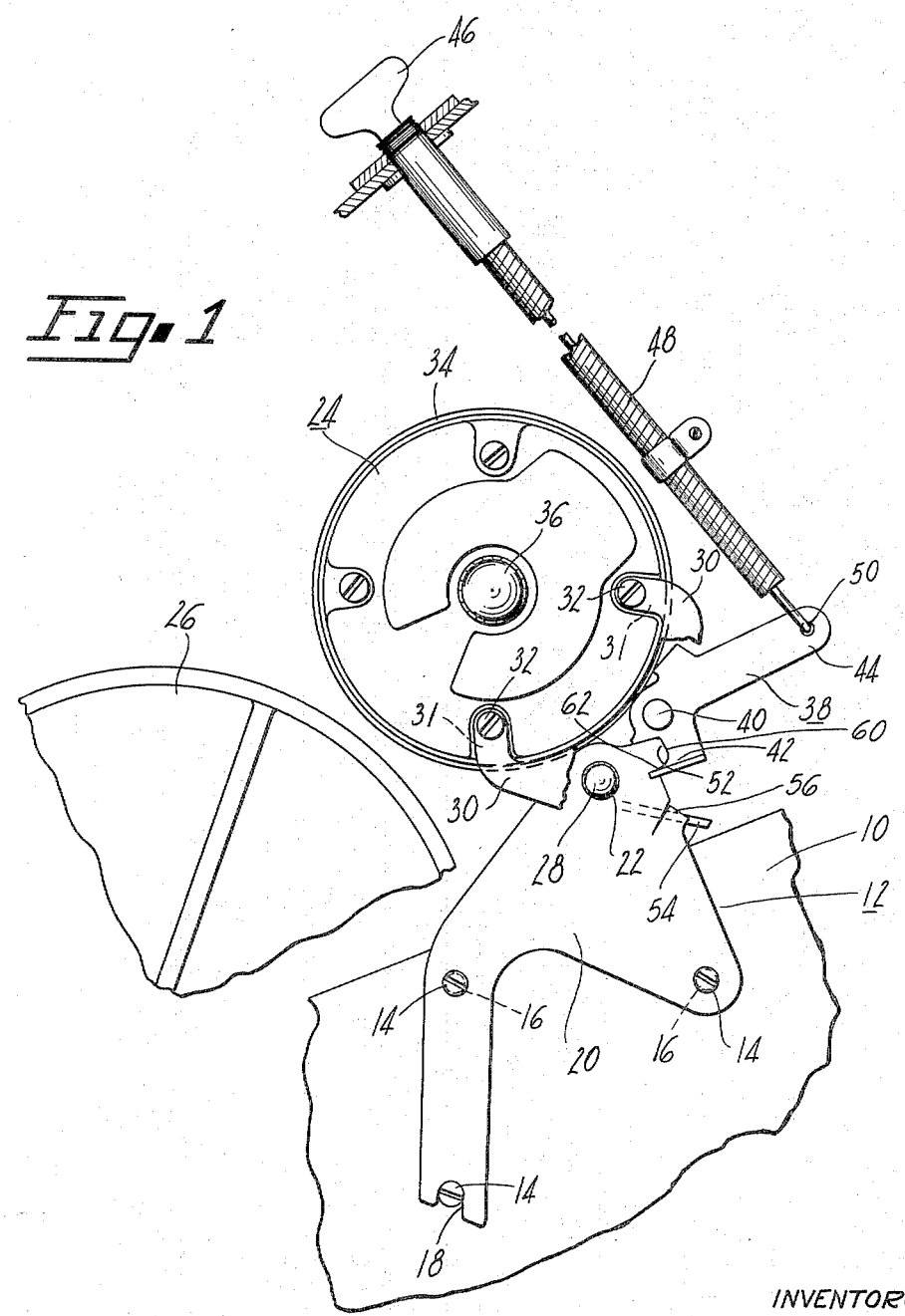
Figure 1 is a side elevational view of the device of the invention arranged in latched position, with parts broken away, and shown mounted to the frame structure of a vehicle.

Referring now to Figure 1 of the drawings the reference numeral 10 designates the frame of a vehicle by which the device of the invention is carried. An articulated supporting bracket 12 is removably secured to the frame 10, by screws 14, which pass through openings 16 and slot 18, in a generator supporting arm 20. The arm is provided with a transverse hub 22, which pivotally supports a generator 24, for engagement with a wheel or rotatable member 26. A pin 28 passes through hub 22, for engagement with a pair of generator supporting members 30 and 31, fastened to each side of the generator by screws 32. This generator supporting structure, comprising, members 30 and 31, is carried by the pin 28, to thereby pivotally support the generator, which is provided with a driving wheel 34, fixed to shaft 36. The generator may be lowered to a position of Figure 3 where wheel 26 is in driving engagement with the generator wheel 34, or raised to a position shown in Figures 1 and 2. In the latter position the generator is releasably latched out of contact with the wheel 26 by an actuating lever 38, pivotally carried at 40, by one of the members 30 or 31. At one end the actuating lever is provided with a latch or pawl 42, integral with the actuating lever and disposed adjacent to the pivot 40. The other end of the actuating lever forms a lever arm 44 of sufficient length to give considerable mechanical advantage to permit the generator to be rotated about pin 28, into and out of engagement with the rotatable member 26, by pushing or pulling a knob 46 operatively connected to one end of a Bowden cable 48, the other end of which is secured to the lever arm 44 at 50.

Adjacent to the generator pivot pin 28, the generator supporting arm 20 is provided with a latch engaging portion or cam 52, for engagement with the pawl or latch 42 to releasably hold the generator out of engagement with the driving wheel 26. A coiled spring 54 encircles the hub 22. The spring has one of its ends engaging a lip 56 of the supporting arm 20, and its other end abutting a projection 58 carried by the lower end of the actuating lever. With this arrangement of the coiled spring there is a tendency for the generator to be rotated in a counterclockwise direction about pivot pin 22, as viewed in Figure 1. The cam 52 is profiled along cam face 60 in such a manner that rotation of the actuating lever 38 in a counterclockwise direction, as viewed in Figure 3, to thereby rotate the generator out of driving relationship with wheel 26, will only cause the pawl to slide along the face 60 carrying the generator with it, that is, allow the actuating lever to rotate about pivot 28 with the generator until the pawl passes beyond cam face 62, at which time the actuating lever is rotated in a counterclockwise direction around pivot 40 to releasably latch the generator in position, see Figures 1 and 2. It will be noted that to rotate the generator out of driving relationship with wheel 26, as shown in Figure 3, it is only necessary to push on knob 46, connected to one end of the Bowden cable, whereby the generator is rotated to the position of Figures 1 and 2.

Figures 3, 4:
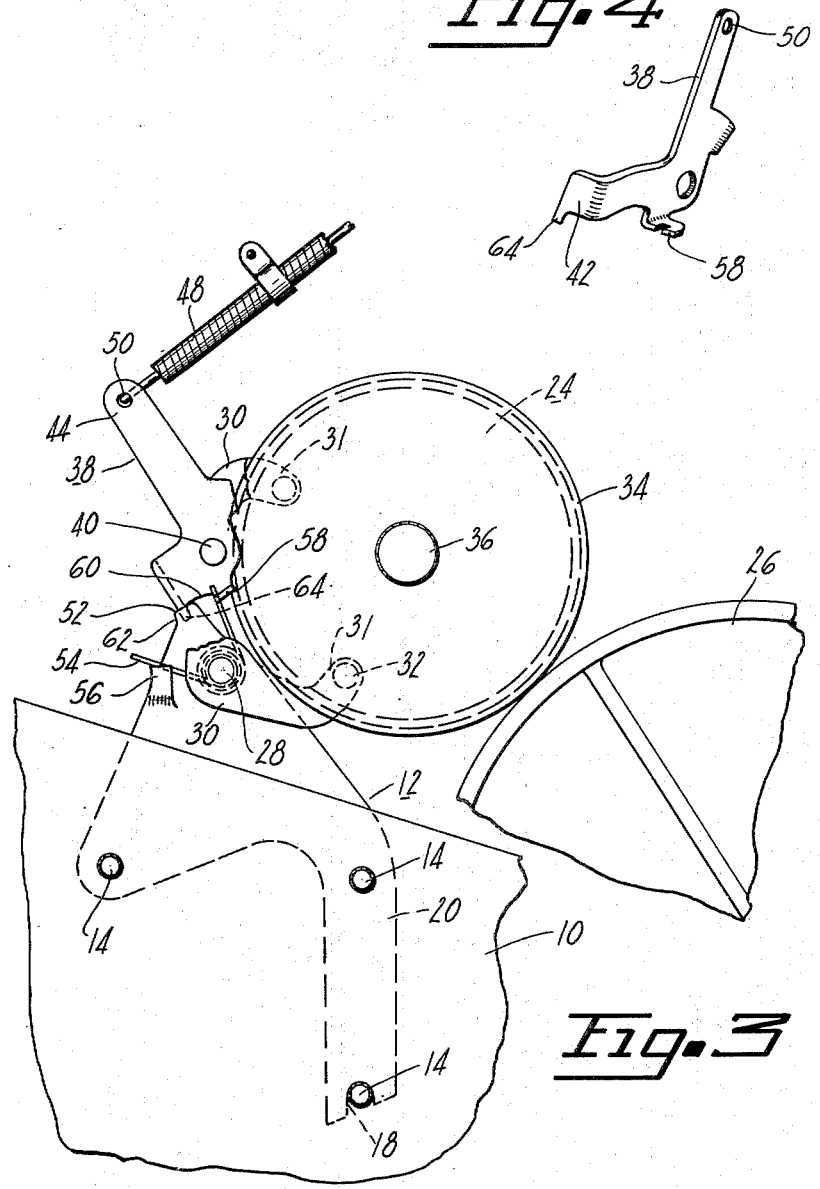
Figure 3 is a view of the device taken from the same side of the vehicle as Figure 2, but with the device in released position.
Figure 4 is a perspective view of one of the elements of the device of the invention.

To release the generator so that wheel 34 thereof is in driving relationship with wheel 26, see Figure 3, actuating lever 38 is rotated clockwise, see Figure 2, by pulling on knob 46. It will be noted that the actuating lever is rotated in the same direction as the generator must be rotated to be released. To accomplish this action, the cam 52 is provided with a second cam face 62 formed so that when the actuating lever is rotated clockwise from the position shown in Figure 2 the latch 42 slides along the cam face 62 until the latch completely disengages the latter cam face, at which time the generator is rotated clockwise by spring 54 to thereby position the generator in driving engagement with wheel 26. To prevent lateral movement of the actuating lever 38 and generator 24 with respect to the supporting arm 20, the latch 42 is provided with a finger 64 constituted to engage the cam 52.

Although this invention has been described in connection with certain specific embodiments, the principles are susceptible of numerous other applications that will readily occur to persons skilled in the art.

Having thus described the various features of the invention, what we claim as new and desire to secure by Letters Patent is:

We claim:

1. A mechanism for positioning a motor or generator in driving relationship with a rotatable member comprising a supporting arm, means for rotatably mounting a motor or generator on said arm, means including an actuating lever pivotally carried by said first named means for moving said motor or generator into and out of driving relationship with said rotatable member and for releasably holding said motor or generator out of driving relationship, said supporting arm being formed with a cam thereon, and said actuating lever being provided with a latch for engagement with said cam to thereby releasably hold said motor or generator out of driving relationship with said rotatable member, and a spring interposed between the arm and actuating lever and arranged so that the spring produces rotation of said motor or generator with respect to said arm when the latch is disengaged from said cam.

2. A mechanism for mounting a device having two positions comprising a supporting arm, means for rotatably mounting a device on said arm, means for selectively positioning said device in any one of its positions including an actuating lever constituted to be pivotally carried by said first named means and having a latch formed on one end thereof, said supporting arm having a latch engaging portion formed thereon constructed and arranged for engagement with said latch to releasably hold said device in one position, and means connected to said lever to remotely disengage said latch from said latch engaging portion.

3. A mechanism for mounting a device having two positions comprising a supporting arm, means for rotatably mounting a device on said arm, means for selectively positioning said device in any one of its positions including an actuating lever constituted to be carried by said first named means and having a latch formed on one end thereof, said supporting arm having a cam formed thereon constructed and arranged for engagement with said latch to releasably hold said device in one of its positions, and a Bowden cable operatively connected to said actuating lever for remotely operating said lever to thereby move said device to its other position.

4. A mechanism for positioning a motor or generator in driving relationship to a rotatable member and comprising a fixed supporting arm, means for rotatably mounting a motor or generator on said arm, an actuating lever constituted to be pivotally carried by said means and having a latch formed on one end thereof, said supporting arm having a latch engaging portion formed thereon constructed and arranged for engagement with said latch to releasably hold said motor or generator, and a spring interposed between said arm and lever, said spring having one end in engagement with said latch and the other end abutting said arm, whereby said motor or generator is rotated into driving relationship with said rotatable member when said latch is disengaged from said cam.

5. A mechanism for positioning a motor or generator in driving relationship with a rotatable member comprising a supporting arm provided with a hub, means for rotatably supporting a motor or generator by said hub, and means including an actuating lever carried by said first named means for moving said motor or generator into and out of driving relationship with said rotatable member and for releasably holding said motor or generator out of driving relationship, said supporting arm being formed with a cam thereon and said actuating lever being provided with a latch for engagement with said cam to thereby releasably hold said motor or generator out of driving relationship with said rotatable member.

6. A mechanism for positioning a motor or generator in driving relationship with a rotatable member comprising a supporting arm provided with a hub, means for rotatably supporting a motor or generator by said hub, means including an actuating lever carried by said first named means for moving said motor or generator into and out of driving relationship with said rotatable member and for releasably holding said motor or generator out of driving relationship, said supporting arm being formed with a cam thereon and said actuating lever being provided with a latch for engagement with said cam to thereby hold said motor or generator out of driving relationship with said rotatable member, and means remotely located from said actuating lever and operatively connected thereto for positioning said motor or generator.

7. A mechanism for supporting a device in two positions comprising an arm, means for rotatably mounting said device on the arm, a latch engaging portion integral with said arm, and an actuating lever pivotally carried by said means and having a latch integral therewith constituted to engage said latch engaging portion to releasably hold said device in one of its positions, said actuating lever being actuable by rotary action to release said latch to thereby move said device to its other position.

8. An articulated bracket for carrying a generator in driving relationship to a driving member comprising a supporting arm provided with a latch engaging portion, supporting structure adapted to carry a motor or generator and constructed and arranged to be pivotally mounted to said arm, a manually operated lever having a latch thereon for engaging said latch engaging portion of said arm, said lever being pivotally mounted on said supporting structure to receive rotary movement to thereby disengage said arm.

ROYAL J. REEK.
FRANKLIN O. WISMAN.

REFERENCES CITED

The following references are of record in the file of this patent:

UNITED STATES PATENTS

| Number | Name | Date |
|---|---|---|
| 2,026,373 | Bush | Dec. 31, 1935 |
| 2,088,029 | McDermott | July 27, 1937 |
| 2,430,429 | Katcher | Nov. 4, 1947 |